(12) United States Patent  
Ying

(10) Patent No.: US 8,112,327 B2  
(45) Date of Patent: Feb. 7, 2012

(54) METHOD AND SYSTEM OF BIDIRECTIONAL MARKETING WITH FEEDBACK

(76) Inventor: Guangrong Ying, Beijing (CN)

( * ) Notice: Subject to any disclaimer, the term of this patent is extended or adjusted under 35 U.S.C. 154(b) by 402 days.

(21) Appl. No.: 11/569,729

(22) PCT Filed: Jun. 23, 2004

(86) PCT No.: PCT/CN2004/000673  
§ 371 (c)(1),  
(2), (4) Date: Nov. 28, 2006

(87) PCT Pub. No.: WO2005/116881  
PCT Pub. Date: Dec. 8, 2005

(65) Prior Publication Data  
US 2009/0030817 A1  Jan. 29, 2009

(30) Foreign Application Priority Data  
May 28, 2004 (CN) .......................... 2004 1 0042866

(51) Int. Cl.  
*G07B 17/00* (2006.01)  
*G06Q 30/00* (2012.01)

(52) U.S. Cl. .......................................... 705/30; 705/14

(58) Field of Classification Search .................. 705/30  
See application file for complete search history.

(56) References Cited

U.S. PATENT DOCUMENTS

| | | | | |
|---|---|---|---|---|
| 4,885,685 A | * | 12/1989 | Wolfberg et al. | 705/14 |
| 5,025,372 A | * | 6/1991 | Burton et al. | 705/14 |
| 5,537,314 A | * | 7/1996 | Kanter | 705/14 |
| 5,878,404 A | * | 3/1999 | Stout et al. | 705/38 |
| 5,950,176 A | * | 9/1999 | Keiser et al. | 705/36 R |
| 6,016,483 A | * | 1/2000 | Rickard et al. | 705/36 R |
| 6,662,164 B1 | * | 12/2003 | Koppelman et al. | 705/14 |
| 6,980,962 B1 | * | 12/2005 | Arganbright et al. | 705/26 |
| 7,069,234 B1 | * | 6/2006 | Cornelius et al. | 705/26 |
| 7,149,707 B2 | * | 12/2006 | Scoble | 705/14 |
| 7,165,044 B1 | * | 1/2007 | Chaffee | 705/37 |
| 7,283,978 B2 | * | 10/2007 | Frankel et al. | 705/35 |
| 7,359,871 B1 | * | 4/2008 | Paasche et al. | 705/26 |
| 7,472,073 B1 | * | 12/2008 | Masi | 705/14 |
| 7,496,525 B1 | * | 2/2009 | Mitchell | 705/26 |
| 2002/0016761 A1 | * | 2/2002 | Foster et al. | 705/37 |
| 2002/0032633 A1 | * | 3/2002 | Okumura | 705/37 |
| 2002/0040307 A1 | * | 4/2002 | Roscoe et al. | 705/4 |

(Continued)

FOREIGN PATENT DOCUMENTS

CN          1451134          10/2003

(Continued)

*Primary Examiner* — Elaine Gort  
*Assistant Examiner* — Ashford S Hayles  
(74) *Attorney, Agent, or Firm* — Workman Nydegger

(57) ABSTRACT

The invention discloses a method and system of bi-directional marketing with feedback, comprising: building up a consuming net system that promotes the business between customer and seller. The consuming net system signs a contract with customer, then the consumer built up, on the other hand, said system signs contract with seller, then the provider built up. The consuming net system receives commission from the provider and returns interest to the consumer according to the contract. The method and system adds the steps of interest distributing and information distributing during circulate service, so that customer can get balanced information during consuming, and also he can get balanced interest. The present invention changes the way of information dissemination and unfair distributing system. It eludes the economic crisis at all.

10 Claims, 3 Drawing Sheets

U.S. PATENT DOCUMENTS

| | | | | |
|---|---|---|---|---|
| 2002/0046158 | A1* | 4/2002 | Kelly et al. | 705/38 |
| 2002/0052818 | A1* | 5/2002 | Loveland | 705/36 |
| 2002/0052822 | A1* | 5/2002 | Terashima | 705/37 |
| 2002/0069144 | A1* | 6/2002 | Palardy | 705/32 |
| 2002/0174070 | A1* | 11/2002 | Eda et al. | 705/40 |
| 2002/0178104 | A1* | 11/2002 | Hausman | 705/37 |
| 2003/0004803 | A1* | 1/2003 | Glover et al. | 705/14 |
| 2003/0004809 | A1* | 1/2003 | Palcic et al. | 705/14 |
| 2003/0055776 | A1* | 3/2003 | Samuelson | 705/37 |
| 2003/0120566 | A1* | 6/2003 | Lipschutz et al. | 705/30 |
| 2003/0144943 | A1* | 7/2003 | Zivan | 705/37 |
| 2003/0191705 | A1* | 10/2003 | Miyata et al. | 705/36 |
| 2004/0162771 | A1* | 8/2004 | Tamatsu et al. | 705/30 |
| 2004/0193439 | A1* | 9/2004 | Marrott | 705/1 |
| 2004/0193536 | A1* | 9/2004 | Marlowe-Noren | 705/39 |
| 2004/0215542 | A1* | 10/2004 | Rossides | 705/35 |
| 2005/0108152 | A1* | 5/2005 | Tsoa-Lee et al. | 705/38 |
| 2005/0108153 | A1* | 5/2005 | Thomas et al. | 705/39 |
| 2005/0154666 | A1* | 7/2005 | Angle | 705/36 |
| 2005/0273418 | A1* | 12/2005 | Campbell | 705/37 |
| 2006/0047575 | A1* | 3/2006 | Palazzo | 705/26 |
| 2006/0089892 | A1* | 4/2006 | Sullivan et al. | 705/35 |
| 2006/0111998 | A1* | 5/2006 | Fisher et al. | 705/35 |
| 2006/0175392 | A1* | 8/2006 | Schmidt et al. | 235/377 |
| 2006/0200398 | A1* | 9/2006 | Botton et al. | 705/35 |
| 2006/0247970 | A1* | 11/2006 | Sattelmaier | 705/14 |
| 2006/0277084 | A1* | 12/2006 | Barnard et al. | 705/7 |
| 2007/0050308 | A1* | 3/2007 | Latvala et al. | 705/80 |
| 2007/0100720 | A1* | 5/2007 | Bonvouloir | 705/36 R |
| 2007/0100726 | A1* | 5/2007 | O'Flinn et al. | 705/36 R |
| 2007/0112666 | A1* | 5/2007 | Gasparri | 705/38 |
| 2007/0208637 | A1* | 9/2007 | Cooper et al. | 705/30 |
| 2007/0233594 | A1* | 10/2007 | Nafeh | 705/37 |
| 2008/0294508 | A1* | 11/2008 | Alan | 705/14 |
| 2008/0300991 | A1* | 12/2008 | Openiano | 705/14 |

FOREIGN PATENT DOCUMENTS

CN      1480887      3/2004

* cited by examiner

METHOD AND SYSTEM OF BIDIRECTIONAL MARKETING WITH FEEDBACK

CROSS-REFERENCE TO RELATED APPLICATIONS

This application is a nationalization of PCT Application No. PCT/CN2004/000673, filed Jun. 23, 2004, which claims priority to Chinese Patent Application No. 200410042866.5 filed May 28, 2004, the contents of which are incorporated herein by specific reference.

BACKGROUND OF THE INVENTION

1. Field of the Invention

This invention relates to a marketing method and system, especially a method and system of bi-directional marketing with feedback that can increase the interest distributing and information distributing links during the circulative service course.

2. Background of the Invention

It is known to all, that production surplus and economic crisis are common phenomena in market economy, and a necessary result of the high-speed development of capital economy. While the causes for economic crisis are based on two points largely, firstly, the imbalance in supply structure and demand structure caused by information decentralization; secondly, the imbalance in general supply and general demand caused by distribution unfairness. In practical economic life, the imbalances in structure and general volume are usually interwoven, and the emergence of economic crisis can never be substantially eluded.

In reality, in order to increase consumption expenditure, and alleviate economic crisis, currency policy and financial policy are normally adopted. However, along with further economic development, the degree of economic crisis gradually deepens, and the surplus becomes more serious, the currency policy and the policy on enlarging governmental investment can no longer efficiently alleviate economic crisis. Because all above solutions are corresponding measures formulated according to the superficial phenomena occurred during economic development, which don't involve the root of problem, but only cure the symptoms, not the disease, and attend to one thing and neglect the other.

From macro point of view, the above problem exists with the current marketing mode, when analyzing the above problem in micro environment, the specific situation is as follows: the purchasing and consuming behavior, which is familiar and not regarded as strange, but right and proper by people for thousands of years, is at a unsymmetrical status in terms of interest during the whole production and sales course, namely in the production, sales, purchasing, consuming and many other links, the producer gains interest from supply of various commodities to the society; the seller distributes commodity for the producer, and provides commodity for the consumer as an indispensable tie linking the producer and consumer, and at the same time providing services for the two, and therefore should be able to gain interest; only the consumption link, the last one, has no interest. But in fact, the consumer's purchasing behavior is a behavior of providing social reproduction to the supplier of commodity or service, and the most important link in the whole circulating process. Reproduction cannot be mentioned without consumption, which offers possibility for the producer and distributor to gain interest, while such a behavior cannot simply equal the use value of commodity, since under the circumstance that the commodity involves in the transaction, the whole transaction is not that "fair" as barter transaction, but rather has multiple interest distributing links, in relation to other beneficial links, the consumption link is unsymmetrical. The non-symmetry of interest leads to passive, inactive and discontinuous consumption behavior, and to the non-symmetry of information existing on many markets, on which one party usually masters more information than the other. It is just because the non-symmetry of information that the displaying of market function is restricted, and thus the timely automatic adjustment on commodity supply and demand relation by price mechanism will be influenced, finally leading to imbalance of demand and supply, and causing economic crisis. Therefore, it is the important theme that the creator of this invention intends to solve how to elude the tumor in economic development, and how to arrange brand new economic development mode.

SUMMARY OF THE INVENTION

The object of this invention is to, against the shortcoming in current economic operating mode, offer a bi-directional and reserved marketing method and system that can increase the interest distributing and information distributing link, and enable the consumer to acquire symmetric information and interest in the consumption course.

In order to realize the above purpose, the method of bi-directional marketing with feedback in this invention is attained as follows:

Set up consuming net system that can enhance the transaction between consumers and sellers, which on the one hand signs contract with the consumers to form the demanding party, and on the other hand signs contract with the seller to form the supplying party, the consuming network system charges commission from the supplier according to contract, and returns the interest to the consumer according to contract.

The said consuming net system includes commodity information system that traces and records the seller's transactions, and, when the sales reach a certain specified time value, the consuming net system will settle with the supplier according to the contract, and when consumption volume reaches a certain specified value, the consuming net system will settle with the consumer.

The amount of interest that the said consuming net system returns to the consumer is N times of the commission charged from the corresponding supplier, where N is a real number larger than 1.

The said consuming net system returns the interest in installments to the consumer within a period of completing the transaction.

The said consuming net system grades the consumer's consumption volume and the supplier's sales volume, and formulates different commission standard and interest-returning standard within different grades.

A system realizing the bi-directional reversed marketing method includes control system, transaction system, monitoring system, interest-returning system and information exchange system, large-scale database is established in each system, and the control system adjusts and controls other systems via Internet, and realizes harmonious operation of each system based on the computation of database.

The said transaction system includes seller database and consumer's database, of which the seller database contains the following information, namely manufacturer, product description, price, appearance features, function, performance, new product information, supply and demand information, advertisement information, and transaction record, etc.; the consumer's database includes code, user name, address, card issuing date, transaction record, and consumer behavior features, etc.

The said transaction system includes device inputting the transaction record in different transaction locations into the database, whose terminal devices includes POS machine.

The said interest-returning system includes a commercial management system composed of information treatment center and financial accounting center to conduct accurate accounting on the transaction, and instant score monitoring, and analyzes the transaction record, so as to determine the amount of commission charged from the supplier and interest returned to the consumer.

The said information exchange system includes commodity information system, service information system and member information system.

The said monitoring system records the consumption status of sellers and consumers with bad credit.

The method and system of bi-directional marketing with feedback in this invention adds a link of interest distributing and information distributing link in the commodity's chain value, so that the consumer can acquire symmetric information in the consumption course, and gain symmetrical benefit during the consumption as well, the more he consumes, the more he earns, and the whole system becomes a capital flow and information flow with bi-directional circulation, so as to activate and promote consumption to the largest extent, enable the benign operation of production, supply and sales, and invigorate the social and economic activities.

The method and system of bi-directional marketing with feedback in this invention enables the participation of third-party consuming net system, so that capital will not flow only to the supplier, the supply and demand information will not be owned by each party, all three parties can benefit from the economic activity, and consumers participate in the interest distributing in the circulating service process. This is obviously different from the traditional planned economy mode and the diverging economic mode in the West, has changed the information transmission mode and unfair distribution system, can realize the symmetry of interest and information, and essentially evade the emergence of economic crisis.

DETAILED DESCRIPTION

Figure 1:
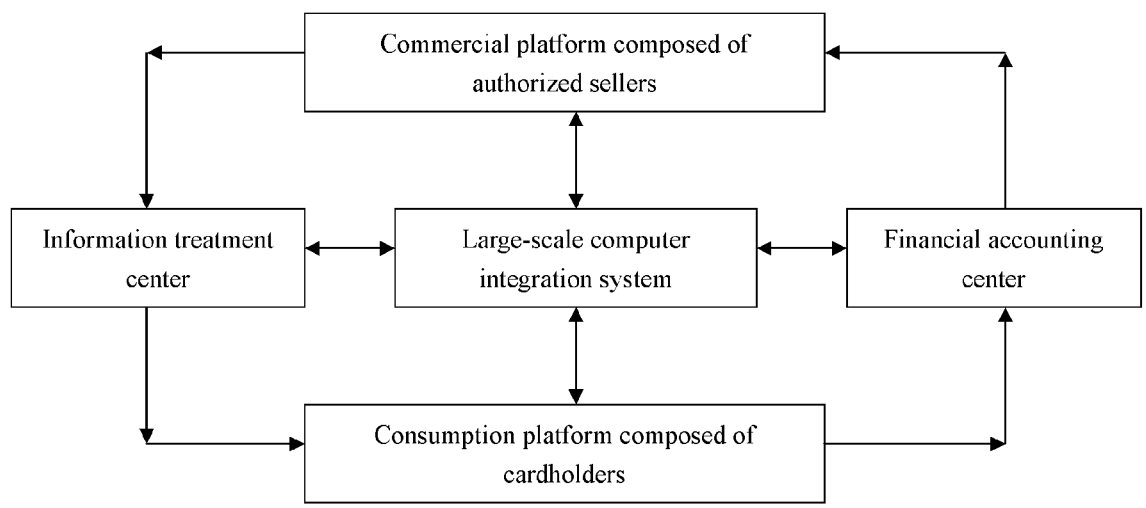
FIG. 1 is a block diagram of method of bi-directional marketing with feedback in this invention
Figure 2:
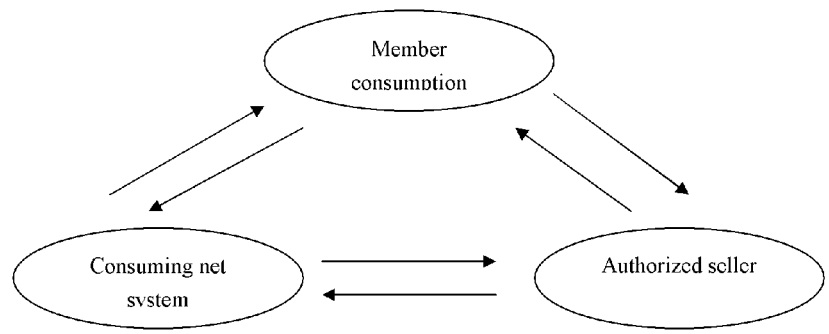
FIG. 2 is a theoretical principle diagram of method of bi-directional marketing with feedback in this invention
Figure 4:
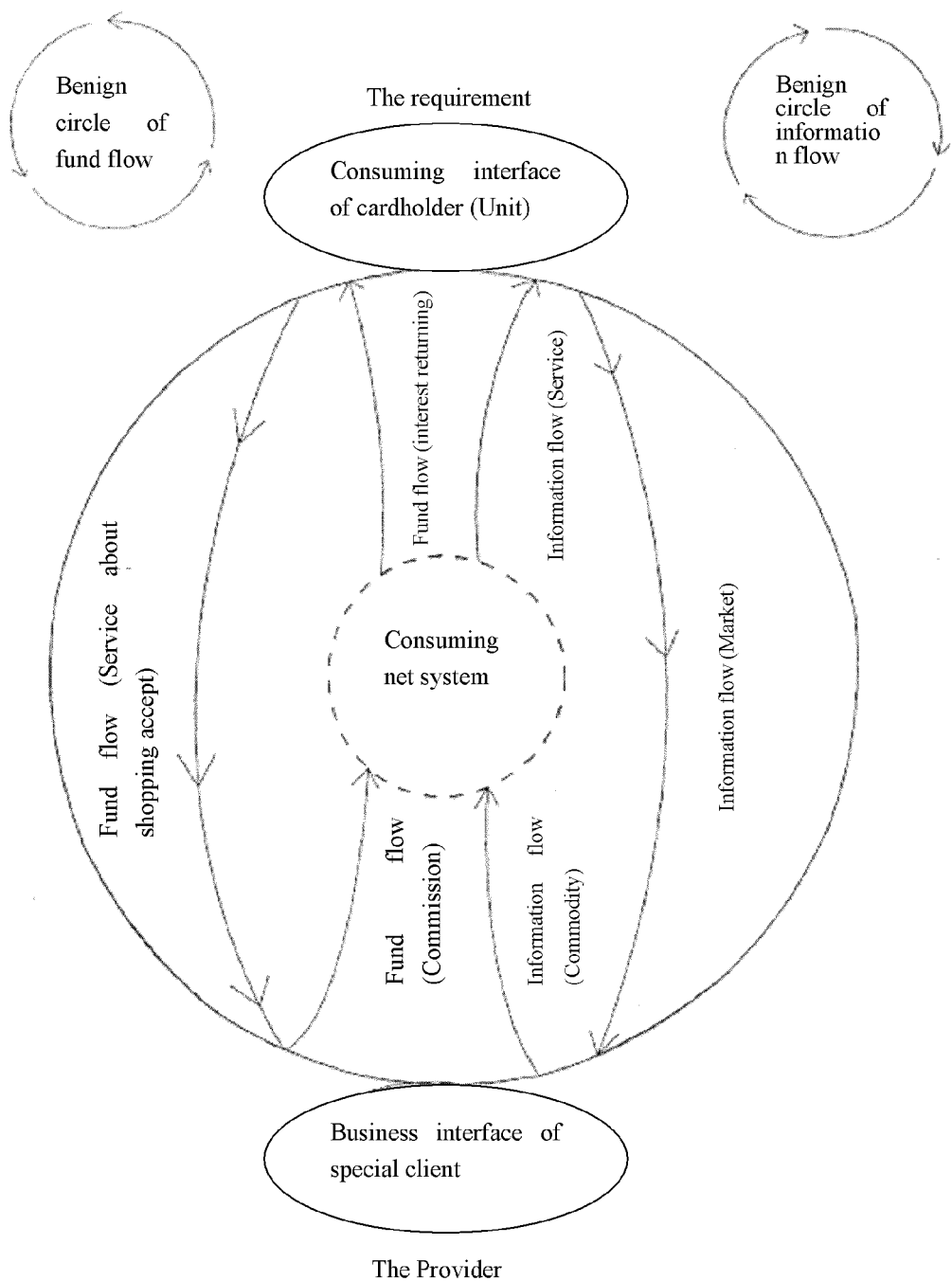
FIG. 4 is a sketch map of method of bi-directional marketing with feedback in this invention

As shown in FIG. 1, FIG. 2 and FIG. 4, the method of bi-directional marketing with feedback in this invention includes the following steps:
1. Establish a consuming net system;

This consuming net system, on the one hand, signs contract with the consumers to form the demanding party, and on the other hand signs contract with the sellers to form the supplying party, the consuming network system charges commission from the supplier according to contract, and returns the interest to the consumer according to contract.

Wherein, the specific operation in Step 2 is as follows:

The consuming net system develops members by issuing consumption card, namely the consumer, by holding valid certification, files the application, and draws consumption card after approval, set up consumption platform, and both parties will sign contract. When consumption volume reaches a certain specified value, the consuming net system will settle with the consumer, and at the same time set up member database, the consumer's database includes code, user name, address, card issuing date, and transaction record, etc. This consuming net system integrates with Internet, information treatment center, and financial accounting center to form commercial management system, conduct accurate accounting on the transaction, and instant score monitoring, to master the operation status of commercial platform. The financial accounting center is composed of financial network and financial actuarial system, the consumption card can be identified by electronic system, and realize the linking with relevant database of commercial management system. At the same time, through screening sellers in a special way, the consuming net system composes qualified sellers into a large-scale commercial platform according to standards such as credit and brand, realize the integral sharing of customer resource, and both parties will sign contract. When the sales reach a certain specified time value, the consuming net system will settle with the supplier according to the contract, and at the same time set up seller database, the seller database contains the following information, namely manufacturer, product description, price, appearance features, function, performance, new product information, supply and demand information, advertisement information, and transaction record, etc.

The consuming net system in this invention has a large-scale computer integration system, with hardware such as computer, data machine, and digit line, etc, and software such as website explorer, e-mail receiver and sender, and information record handler, etc. The computers consist server computer, seller computer, and consuming net system computer, which are connected via communication network.

The consuming net system conveys the commodity information and service information on the commercial platform composed of authorized sellers via Internet, and conveys the member's consumption information to the authorized sellers via Internet, and at the same time charges commission from the authorized sellers according to transaction record and returns the interest to the consumption platform, the consuming net system records the consumers' consumption record and returns the benefit to the consumers regularly. The amount of interest that the said consuming net system returns to the consumer is N times of the commission charged from the corresponding supplier, where N is a real number larger than 1. The consuming net system returns the interest in installments to the consumer within a period of completing the transaction, the times value N and rule of interest returning in installments are determined according to specific transaction scale and frequency, which will be explained in detail in the following.

In practical operation, when the members purchase or receive services in any authorized enterprise and seller that have signed contract with consuming net system, the consumption provider will grant the members with certain consumption credit in the scoring rate of 1-100% according to the consumption amount of the member at each time, and input the transaction record and credit into database corresponding to the consuming net system via POS machine or other inputting device, or issue score sheet and invoice as the proof for the consumer's consumption process and evidence for credit inquiry. The seller pays the commission to the consuming net system according to the proportion provided in the contract, when the consumer's accumulative credit reaches the standard value provided in the contract, he will be granted an award right, and the consuming net system then returns interest to the consumer according to the interest-returning standard. If the whole consumption market is graded into six levels as in the following table, where in, taking the examples of credit rate of 1-30%, and the interest-returning times N=5 for the 1$^{st}$ and 2$^{nd}$ levels, the interest-returning times N=3 for the 3$^{rd}$ and 4$^{th}$ levels, and interest-returning times N=2 for the 5$^{th}$ and 6$^{th}$ levels, different returned interests can be gained.

| Market level | One-time consumption amount | Credit rate | Credit for award right (commission) | Returned amount | Returned times | Returning rule |
|---|---|---|---|---|---|---|
| 1$^{st}$ level | Under 10,000 Yuan | 1-30% | 200 | 1000 | 5 | 10 installments in every 2 months |
| 2$^{nd}$ level | 10,000-1 million Yuan | 1-30% | 2000 | 10000 | 5 | 10 installments in every 4 months |
| 3$^{rd}$ level | 1-10 million Yuan | 1-30% | 20000 | 60000 | 3 | 10 installments in every 6 months |
| 4$^{th}$ level | 10-100 million Yuan | 1-30% | 200000 | 600000 | 3 | 10 installments in every 8 months |
| 5$^{th}$ level | 0.1-1 billion Yuan | 1-30% | 2000000 | 4000000 | 2 | 10 installments in every 10 months |
| 6$^{th}$ level | Above 1 billion Yuan | 1-30% | 20000000 | 40000000 | 2 | 10 installments in every 12 months |

In the consumption market of the 1$^{st}$ level, namely the terminal consumption market network with one-time consumption amount under 10,000 Yuan, when the credit on the membership card accumulates to 200, the accumulative credit value for award right provided by the company (also the commission that the consuming net system charges from the supplier), an award right will be granted, and interest of 1,000 Yuan, namely 5 times of the credit 200, will be returned, the consuming net system will pay 100 Yuan to the card holding member every two months via the banking system from the month when the credit reaches 200, and the interest returning will be completed in 10 times.

In the consumption market of the 2$^{nd}$ level, namely the terminal consumption market network with one-time consumption amount is 10,000-1 million Yuan, when the credit on the membership card accumulates to 2000, the accumulative credit value for award right provided by the company (also the commission that the consuming net system charges from the supplier), an award right will be granted, and interest of 10,000 Yuan, namely 5 times of the credit 2,000, will be returned, the consuming net system will pay 1000 Yuan to the card holding member every four months via the banking system from the month when the credit reaches 2,000, and the interest returning will be completed in 10 times.

Cases with the rest of consuming net system may be deduced with analogy, and interest returning cannot be granted if the pre-set value cannot be reached. After the award right is granted, the rest of credit can be accumulated for the next award right, and the new award right will be generated through continuous consumption credit accumulation. Several award rights acquired simultaneously are granted at the same time. According to the system operation status, consumption structure change, and market management need, the company has the right to change the technical setting of award right at proper time, since the consuming net system will settle with the seller after each transaction, while the returned interest paid to the consumer are lagged and in installment, so as long as the interest returning rule is properly formulated, the consuming net system is always capable of paying a returned interest larger than the commission, let alone when there is great development on the consumption market, the assignment of consuming network database can be initiated, or OEM can be adopted to gain interest to pay and guarantee the returned interest of commission.

Taking J sellers as example, the calculation formula for interest P (t) attainable by the consuming net system is as follows:

$$P(t) = [P_{in}(t) - P_{out}(t)]J$$

$$= \left[\sum_{k=1}^{K} kt - \sum_{k=1}^{KN} Mk(t - 2M)\right]J$$

$$= \left[\frac{K(K+1)}{2}t - \frac{M}{2}(KN(KN+1))t + MM(KN(KN+1))\right]J$$

$$= \left[\frac{1}{2}[K(K+1) - MKN(KN+1)]t + M^2KN(KN+1)\right]J$$

$$= \left[\frac{1}{2}[(K(K+1) - MKN(KN+1)] + M^2kN(KN+1)\right]J$$

Where, t is time (month), K is the credit when returning, N is number of times, and M is the returning cycle.

Figure 3:
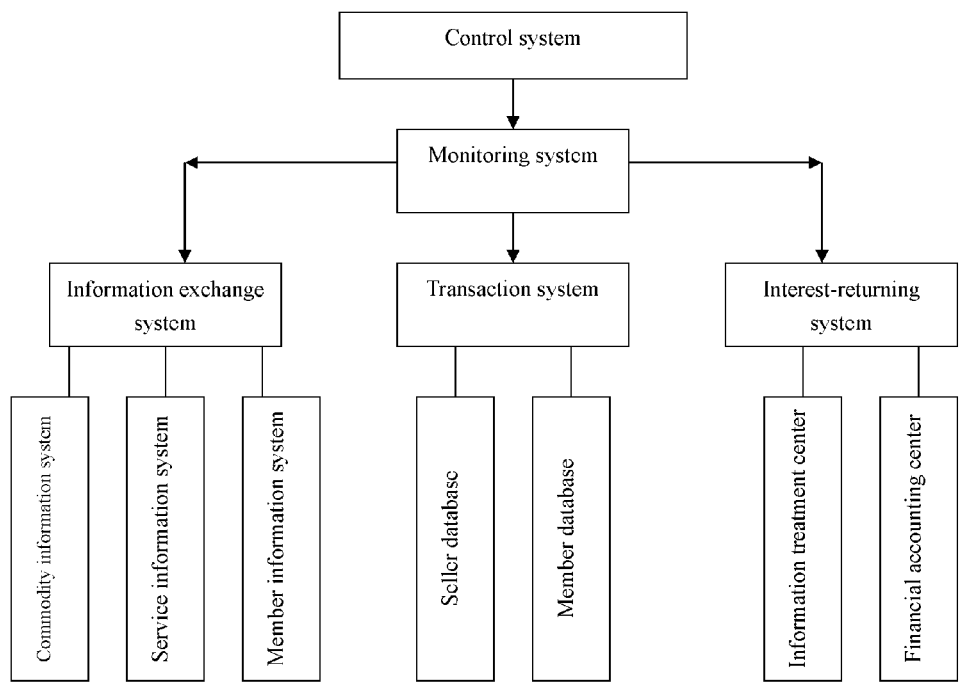
FIG. 3 is a block diagram of method of bi-directional marketing with feedback in this invention

As shown in FIG. 3, the bi-directional reversed marketing method includes control system, transaction system, monitoring system, interest-returning system and information exchange system, large-scale database is established in each system, and the control system adjusts and controls other systems via Internet, and realizes harmonious operation of each system based on the computation of database.

The transaction system includes seller database and consumer's database, recording the transactions between card-holding consumers and the authorized sellers, whose terminal devices includes POS machine, the seller database contains the following information, namely manufacturer, product description, price, appearance features, function, performance, new product information, supply and demand information, advertisement information, and transaction record, etc.; the member database includes code, user name, address, card issuing date, and transaction record, etc.

The interest-returning system includes a commercial management system composed of information treatment center and financial accounting center to conduct accurate accounting on the transaction, and instant score monitoring, and analyze the transaction record, so as to determine the amount of commission charged from the supplier and interest returned to the consumer.

The information exchange system includes commodity information system, service information system and member information system, the sellers and consumers can exchange information via Internet, and the monitoring system records the consumption status of sellers and consumers with bad credit. Marketing management system and monitoring system including BTOB and RTOC e-commercial systems are set up on the server. The marketing management system on server conducts control over the whole operating system, including member control, authorized seller control, and transaction record control.

The said monitoring system records the consumption status of sellers and consumers with bad credit.

In a word, with the method in this invention, the consumer can gain benefit during consumption, and the benefit acquired can be used in consumption, the social wealth is re-distributed to the consumer, while the seller has stable source of loyal customers. In contrast with those sellers not entering this consumption system, these sellers' sales are promoted, rich returns are gained, and enterprise image and brand effect are constantly improved. The consuming net system can also gain interest from the difference between seller's commission and returned interest. So the pleasant situation of win-win-win can be formed.

The invention claimed is:

1. A computer-implemented method of bi-directional marketing with feedback, comprising:
    establishing a first contractual relationship with a first consumer, via a computing device, the first contractual relationship permitting the consumer to purchase commodities, services, or both, from one or more authorized suppliers including a first supplier;
    establishing a second contractual relationship with the first supplier, via a computing device, the second contractual relationship permitting the supplier to offer one or more commodities, services, or both, to one or more approved consumers including the first consumer;
    when the first supplier completes a-sales transactions with the first consumer, charging the first supplier a commission for each sales transaction according to the second contractual relationship;
    granting the first consumer a consumption credit for each sales transaction, via the computing device; and
    returning a monetary interest payment to the first consumer for each sales transaction according to the first contractual relationship, once the first consumer's accumulative consumption credit reaches a standard value, wherein the interest payment is based on an amount of the sales transaction between the first consumer and the first supplier and the commission charged to the first supplier;
    wherein an amount of the monetary interest payment returned to the first consumer for a particular sales transaction is greater than an amount of the commission received from the first supplier for the particular sales transaction such that the amount of the monetary interest payment for the particular sales transaction is equal to N times the amount of the commission charged to the first supplier for the particular sales transaction wherein N is a real number larger than 1.

2. The method of claim 1, further comprising:
    recording sales transactions for authorized suppliers and consumption volume for approved consumers,
    when sales transactions for the first supplier reach a certain specified time value, settling with the first supplier according to the second contractual relationship, and when consumption volume for the first consumer reaches a certain specified value, settling with the first consumer.

3. The method of claim 1, wherein returning the interest payment to the first consumer includes returning the interest payment in installments to the first consumer within a predetermined period after completing the sales transaction.

4. The method of claim 1, further comprising grading consumption volume of the first consumer into one of at least two different grades, wherein each grade includes a different interest-returning standard.

5. The method of claim 1, further comprising grading a sales volume of the first supplier into one of at least two different grades, wherein each grade includes a different commission standard.

6. A computer-implemented method, comprising:
    approving consumers via a computing device to purchase commodities, services, or both, from one or more authorized suppliers, the authorized suppliers being authorized to offer one or more commodities, services, or both, to the approved consumers; and
    when an approved consumer makes a purchase from an authorized supplier: charging via a computing device the authorized supplier a commission, an amount of the commission depending on at least an amount of the purchase and a sales volume of the authorized supplier;
    granting the approved consumer a consumption credit for the purchase, via a computing device; and
    awarding monetary interest to the approved consumer once the first consumer's accumulative consumption credit reaches a standard value, an amount of the monetary interest depending on at least the amount of the purchase made by the approved consumer from the authorized supplier, the amount of the commission charged to the authorized supplier, and a consumption volume of the approved consumer;
    wherein the amount of the monetary interest awarded to the approved consumer for the purchase is greater than the commission charged to the authorized supplied for the purchase such that the amount of the monetary interest is equal to N times the amount of the commission charged to the authorized supplier wherein N is a real number larger than 1.

7. The method of claim 6, further comprising storing one or more of a code, user name, address, card issuing date, or transactions associated with each approved consumer in a consumer database.

8. The method of claim 6, further comprising storing one or more of a manufacturer name, product description, price, appearance features, function, performance, new product information, supply and demand information, advertisement information, or transactions associated with each authorized supplier in a seller database.

9. The method of claim 6, wherein an amount of the interest awarded to the approved consumer is equal to N times an amount of the commission charged to the authorized supplier, less a retained amount, and wherein N is a real number larger than 1.

10. The method of claim 6, wherein the amount of the awarded interest is equal to a first percentage of the amount of the purchase if the consumer has a first consumption volume and is equal to a second percentage of the amount of the purchase if the consumer has a second consumption volume, the second percentage being lower than the first percentage when the second consumption volume is greater than the first consumption volume.

* * * * *